United States Patent [19]

Reidies

[11] Patent Number: 5,273,547

[45] Date of Patent: * Dec. 28, 1993

[54] SOREL CEMENTITIOUS COMPOSITION WHICH TIME RELEASES PERMANGANATE ION

[75] Inventor: Arno H. Reidies, LaSalle, Ill.

[73] Assignee: Carus Corporation, Peru, Ill.

[*] Notice: The portion of the term of this patent subsequent to Oct. 6, 2009 has been disclaimed.

[21] Appl. No.: 772,425

[22] Filed: Oct. 7, 1991

Related U.S. Application Data

[60] Continuation-in-part of Ser. No. 386,411, and a continuation-in-part of Ser. No. 586,409, said Ser. No. 386,411, and Ser. No. 586,409, is a division of Ser. No. 188,419, Apr. 29, 1988, Pat. No. 4,961,751.

[51] Int. Cl.$^5$ .............................................. D06L 3/02
[52] U.S. Cl. ............................................ 8/107; 51/308; 23/313 AS; 252/186.43; 252/186.25; 252/186.27; 252/186.32
[58] Field of Search ...................... 8/107, 158; 51/293, 51/307–309; 23/313, 313 AS; 252/95, 99, 90, 186.43, 186.2, 186.25, 186.27, 186.32; 428/404

[56] References Cited

U.S. PATENT DOCUMENTS

| | | | |
|---|---|---|---|
| 2,219,660 | 10/1940 | Robson et al. | 264/144 |
| 2,657,182 | 10/1953 | Katz | 252/186.32 |
| 3,048,546 | 8/1962 | Lake et al. | 252/95 |
| 3,535,262 | 10/1970 | Hubbuch et al. | 252/186.33 |
| 3,582,376 | 6/1971 | Ames | 106/725 |
| 3,639,284 | 2/1972 | Long et al. | 252/99 |
| 3,660,068 | 5/1972 | Wilson | 71/34 |
| 3,924,037 | 12/1975 | Sullivan | 428/15 |
| 3,945,936 | 3/1976 | Lucas et al. | 252/95 |
| 4,023,955 | 5/1977 | Mueller | 71/64.11 |
| 4,040,850 | 8/1977 | Kyri et al. | 106/673 |
| 4,064,212 | 12/1977 | Kleeberg et al. | 264/117 |
| 4,070,300 | 1/1978 | Moroni et al. | 252/190 |
| 4,082,533 | 4/1978 | Wittenbrook et al. | 71/28 |
| 4,112,035 | 9/1978 | Lawrence | 264/113 |
| 4,130,392 | 12/1978 | Diehl et al. | 8/101 |
| 4,218,430 | 8/1980 | Keppler et al. | 8/102 |
| 4,279,764 | 7/1981 | Brubaker | 252/99 |
| 4,349,493 | 9/1982 | Casberg et al. | 264/37 |
| 4,391,723 | 7/1983 | Bacon et al. | 252/90 |
| 4,391,724 | 7/1983 | Bacon | 252/90 |
| 4,391,725 | 7/1983 | Bossu | 252/90 |
| 4,460,490 | 7/1984 | Barrfod et al. | 252/92 |
| 4,536,182 | 8/1985 | Tatin | 8/107 |
| 4,570,229 | 2/1986 | Breen et al. | 364/476 |
| 4,575,887 | 3/1986 | Viramontes | 8/158 |
| 4,601,845 | 7/1986 | Namnath | 252/99 |
| 4,655,782 | 4/1987 | McCallion et al. | 8/111 |
| 4,655,953 | 4/1987 | Oakes | 252/99 |
| 4,657,784 | 4/1987 | Olson | 427/213 |
| 4,670,037 | 6/1987 | Kistner | 71/1 |
| 4,711,748 | 12/1987 | Irwin et al. | 264/117 |
| 4,732,762 | 3/1988 | Sjogren | 424/409 |
| 4,740,213 | 4/1988 | Ricci | 8/108.1 |
| 4,795,476 | 1/1989 | Bean et al. | 8/107 |
| 4,816,033 | 3/1989 | Hoffer et al. | 8/158 |
| 4,850,156 | 7/1989 | Bellaire | 51/293 |
| 4,919,842 | 4/1990 | Dickson et al. | 252/186.43 |
| 5,004,505 | 4/1991 | Alley et al. | 106/685 |
| 5,152,804 | 10/1992 | Eissele | 23/313 |

FOREIGN PATENT DOCUMENTS

| | | |
|---|---|---|
| 0238779A1 | 10/1986 | European Pat. Off. |
| 0275432A1 | 12/1987 | European Pat. Off. |
| 2311964 | 3/1973 | Fed. Rep. of Germany |
| 3636387A1 | 10/1986 | Fed. Rep. of Germany |
| 842224 | 9/1957 | United Kingdom |
| 2118463 | 4/1982 | United Kingdom |

OTHER PUBLICATIONS

Chemical Abstracts 114:209148w re Ocean Wash Appl'n. No. 360,982, Jun. 1, 1989 & International Application WO 15180.
Manufacturing Clothier, United Trade Press, "All Shook Up" London, Nov. 1986 pp. 27–31.
"Tableting" Chemical Engineering, Dec. 4, 1987, pp. 151–155.
"Agglomeration" Chemical Engineering, Oct. 1951, pp. 161–173.

*Primary Examiner*—R. Bruce Breneman
*Attorney, Agent, or Firm*—Fitch, Even, Tabin & Flannery

[57] ABSTRACT

A Sorel cementitious composition which releases permanganate ion into an aqueous media over time is described. A method of making and using the composition of the invention also are described.

21 Claims, 1 Drawing Sheet

SOREL CEMENTITIOUS COMPOSITION WHICH TIME RELEASES PERMANGANATE ION

This application is a continuation-in-part application of Ser. No. 386,411 filed Jul. 27, 1989, now U.S. Pat No. 5,152,804, and Ser. No. 586,409, filed Sep. 21, 1990, now abandoned both of which are continuation-in-part applications of Ser. No. 188,419 filed Apr. 29, 1988 now U.S. Pat. No. 4,961,751 to Eissele et al. This application relates to a composition which includes a hydrated Sorel cement, a water soluble permanganate salt and a method of making that composition. This application also relates to a method for the time release of permanganate ion into an aqueous media.

BACKGROUND OF THE INVENTION

Controlled or timed release is primarily a technique for the control of the rate of delivery of a chemical substance. Release of a chemical substance over time is widely used in connection with pharmaceuticals, pesticides, herbicides, and fertilizers and also in many other cases where a particular chemical agent must be administered on a periodic or sustained basis.

During the last several decades, many different technologies for the controlled release of chemical substances have been developed: encapsulation, entrapment, osmotic pumps, reservoirs, soluble glasses and erosible/degradable matrices. While suitable techniques for the time release of a great number of specific chemical agents (organic as well as inorganic) are available no practical, more generally applicable system is available for any of the permanganates, a family of strong oxidizing agents.

Water soluble salts of permanganic acid, such as $KMnO_4$, are sold for a great variety of uses: organic synthesis, organic solvent purification, water, waste water and air purification, metal surface treatment, the etching of plastics and numerous other applications. In many of these use areas, the permanganate must be added at a controlled rate to produce a predetermined concentration range which avoids underdosing and overdosing. The controlled addition is usually achieved by employing mechanical feeding devices for either the dry product or its aqueous solution. Mechanical feeding devices, however, require the availability of electric power at the point of use for the operation of feeders. This availability requirement can be a problem in certain environmental uses of permanganate such as the odor ($H_2S$) abatement in sewer collection lines. In this and many other applications such as water treatment, it would be highly advantageous to have a suitably formulated product available that is designed to release permanganate ion at the required predetermined rate without the benefit of any mechanical/electric dosing equipment.

When addressing the problem of developing a controlled release permanganate, it becomes quickly apparent that the oxidative and corrosive properties of permanganate preclude the use of many of the materials customarily used in the preparation of time release formulations. Thus, for all practical purposes, practically all organics as encapsulants, matrix materials or coatings are not useable, as are all oxidizable inorganics.

It is an object of this invention to provide a composition which releases permanganate ion at a controlled or timed rate in an aqueous media.

Another object of this invention is to make a molded cementitious composition which includes permanganate substantially distributed throughout, but is substantially free of permanganate at its surface.

It is yet another object of this invention to provide a method for the controlled release of permanganate ion in an aqueous media.

These and other objects and advantages of the invention will be found by reference to the following description.

SUMMARY OF THE INVENTION

The composition of the invention comprises Sorel cement in combination with a water soluble permanganate salt which combination is molded into a hardened hydrated slightly water soluble cementitious product having a discrete shape such as a sphere, pillow, rod or rectangular slab. According to the invention the cementitious product solubilizes in an aqueous media at a rate which is slow and permits the gradual and controlled release of the permanganate into the aqueous media. The composition of the invention is unique from other hydratable cementitious products which have been formed and cured with a water soluble permanganate salt because the hydrated cured product such as a pellet has a cementitious outer layer or skin which is substantially free of permanganate salt. Other hydratable cements such as gypsum, Portland cement or magnesium oxide cement permit the relative movement of cement and permanganate during curing such that after curing a slightly greater concentration of permanganate salt results at the surface of cured pellet as compared to the concentration of salt in other areas of the pellet. Surprisingly, Sorel cement suppresses this relative migration during curing or hydration such that after curing a thin outer layer or skin results which is substantially free of permanganate salt. A cross-sectional cut through the hardened, hydrated cured Sorel cement pellet reveals small permanganate salt crystals distributed throughout, but below the outer layer or skin leaving a Sorel cementitious outer layer of the pellet substantially permanganate free, an outer layer having less than about 0.001 g/cc of permanganate salt.

In another aspect of this invention, the outer layer or skin may be thickened or enhanced by coating the cured product with another layer of Sorel cement to further control and/or delay the release of permanganate ion in an aqueous media.

In either aspect of the invention, the solubility of the Sorel cement and the permanganate salt below another layer or layers of Sorel cement in the cured product permits the control of the rate of release and/or delayed release of permanganate from the cured product into an aqueous media when the cured product is immersed in that media.

Sorel cement is a hydrated combination of $MgCl_2$ and MgO, $MgSO_4$ and MgO or $MgCl_2$, $MgSO_4$ and MgO. A MgO product which may be used in the invention is commercially available as Mag Chem 30 from Martin Marietta Company. Sorel cement is slightly water soluble and that solubility may be increased by increasing the relative amounts of $MgCl_2$ or $MgSO_4$ to MgO. The slight water solubility of the cement in combination with small crystals of the permanganate salt distributed throughout the pellet below the outer layer provides a unique product which comprises a layer of soluble cement over a cementitious core which has a high concentration of water soluble permanganate salt. In an aqueous media the outer cementitious layer dissolves, and depending on the solubility of the outer cementitious layer, delays and/or controls the release of permanganate into the aqueous media.

Another important aspect of the invention is the method of making the controlled release hydrated Sorel cement permanganate product. The method includes mixing Sorel cement, a water soluble permanganate salt and water, the mixture having at least about 5 to about 35 weight percent water and the Sorel cement to permanganate salt in the ratio of from about 20:40 to about 60:80 Sorel cement to salt. Thereafter the mixture is poured into molds and the cement cured. After curing further layers of Sorel cement may be added over the cured product.

Another aspect of the invention provides a method for the controlled release of permanganate in an aqueous media. The method includes mixing the composition of the invention into an aqueous media.

DESCRIPTION OF THE PREFERRED EMBODIMENTS

Figure 1:
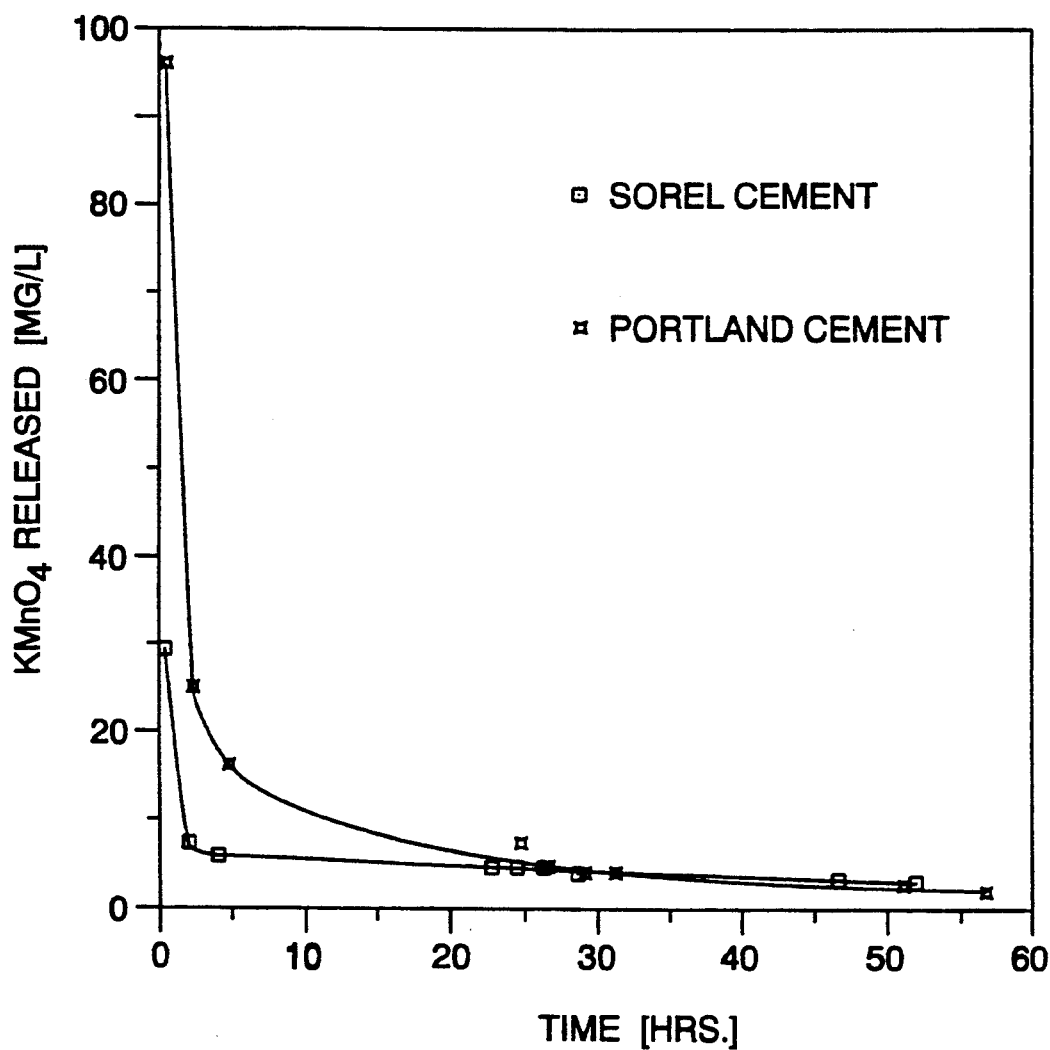
FIG. 1 compares the release rates of Portland cement vs. Sorel cement in a dynamic flow of water of 0.2 L/min.

The invention includes a Sorel cement product comprising a hydrated Sorel cement, a water soluble permanganate salt, a method of making the Sorel cement product and a method for the release of permanganate ion in water using the hydrated Sorel cementitious product of the invention.

As used herein, "hydrated Sorel cement" means a hydrated combination of $MgCl_2$ and MgO, $MgSO_4$ and MgO or $MgCl_2$, $MgSO_4$ and MgO. In the invention after hydration for the core material, the $MgCl_2$ or $MgSO_4$ are present in a ratio of at least about 1 mole $MgCl_2$ or $MgSO_4$ for about every 30 moles MgO (or 1:13 weight ratio) and preferably at least about 1 mole $MgCl_2$ or $MgSO_4$ for about 3.6 to about 8.3 moles MgO (or 1:1.5 to 1:3.5 weight ratio). Sorel cement can include a combination of $MgCl_2$, $MgSO_4$ and MgO with the $MgSO_4$ being at least partially interchangeable with $MgCl_2$. As a coating material which overlies the core, the Sorel cement will have different $MgCl_2$ or $MgSO_4$ to MgO ratios. For coatings the molar ratio of $MgCl_2$ or $MgSO_4$ to MgO broadly is about 1:1 to about 1:10 (or 1:0.42 to 1:4.2 weight ratio) and preferably is about 1:4 to about 1:6 (1:1.7 to 1:2.5 weight ratio).

While this application uses the formula "MgO" in connection with Sorel cement, during curing MgO is transformed into $Mg(OH)_2$. In the case of the oxychloride embodiment of the cement and invention, the cement after curing is $MgCl_2 \cdot 5\ Mg(OH)_2 \cdot 8H_2O$.

"Water soluble permanganate salt" means permanganate salts having a water solubility in water at 25° C. of at least about 55 g/L. Particularly common water soluble permanganate salts include $KMnO_4$ and $NaMnO_4$.

"Molded product" means a product which is formed in molds without any substantial external pressure to form the product.

The composition of the invention is a hydrated Sorel cement product which includes hydrated Sorel cement and small crystals of a water soluble permanganate salt. The product has a hydrated Sorel cement outer layer which is substantially free of water soluble permanganate salt. "Substantially free of soluble permanganate salt" means that not more than about 0.001 g/cc of water soluble permanganate salt is present in the outer layer of the product. The product also has a core below the outer layer. The core includes hydrated Sorel cement and the small crystals of the water soluble permanganate salt such that the product as a whole (including the outer layer) comprises from about 10 to about 70 weight percent Sorel cement and from about 30 to about 90 weight percent water soluble permanganate salt and preferably from about 20 to about 40 weight percent Sorel cement and from about 60 to about 80 weight percent permanganate salt.

The Sorel cement outer layer is very slightly soluble in water. This solubility is only slight compared to other inorganic compounds which are considered water soluble, but the solubility of the composition of the invention is sufficiently significant that when the composition of the invention is put into an aqueous media, there is dissolution of the outer layer and release of the permanganate ion into the water. Studies have shown that hydrated Sorel cement loses 14.5 percent of its weight when kept in running water at about room temperature for one day (Japanese Application 79/100,362, 6 Aug. 1979) and 29.5% of its weight when kept in running water at about room temperature for 28 days. (Japanese Application 80/21,255, 21 Feb. 1980). This dissolution is important to the release of the permanganate ion into the aqueous media over time.

While not intending to be bound by any theory, it is believed that when the composition of the invention is put into or immersed into water, the water removes the $MgCl_2$ or $MgSO_4$ from the hydrated Sorel cement mixture or composition. This removal alters the cement matrix (which had been a hydrated cement) to permit water to permeate into the product, dissolve the permanganate salt and remove it from the product for release into the aqueous media. The removal of the $MgCl_2$ and/or $MgSO_4$ from the hydrated cement while the product is in water eventually exposes the water soluble permanganate salt in the composition of the invention to water. With the exposure of the water soluble permanganate salt to water, permanganate ion is released into the aqueous media. Using the composition of the invention, the hydrated Sorel cement outer layer is first dissolved which exposes the hydrated Sorel cement/permanganate salt core. The hydrated Sorel cement/permanganate salt core is further dissolved as permanganate ion along with $MgCl_2$ and/or $MgSO_4$ is further removed from the core into the aqueous media. The composition of the invention, permits a higher initial release rate of permanganate ion, this release rate quickly levels out and permits a relatively constant release of permanganate ion over a time period such as from a few hours to several days or even weeks.

Further, it has been found that the rate of release and dissolution of the Sorel cement may be controlled by the amount of $MgCl_2$ or $MgSO_4$ used in making the hydrated Sorel cement. The higher the concentration of $MgCl_2$ or $MgSO_4$ in the cement, the higher the rate of release of permanganate salt will be. Again, while not intending to be bound by any theory, more $MgCl_2$ or $MgSO_4$ will be available for removal from the cement matrix to permit water to permeate the product to remove the permanganate salt. Tests of uncoated Sorel cement pellets subjected to static leaching with water showed that removal or leaching of permanganate increased by increasing the relative amounts of $MgCl_2$ to MgO. This is shown in Table I.

TABLE I

| % KMnO4 Content | MgCl2:MgO | % of Total KMnO4 Released at Hrs. | | |
| --- | --- | --- | --- | --- |
| | | 1 hr. | 5 hrs. | 30 hrs. |
| 58.1 | 1:7.2 | 5.6 | 13.7 | 37.1 |
| 60.0 | 1:2.9 | 12.9 | 34.4 | 74.8 |
| 39.2 | 1:7.2 | 2.8 | 9.4 | 35.6 |
| 40.0 | 1:2.9 | 13.9 | 39.3 | 83.0 |
| 20.0 | 1:7.2 | 1.6 | 10.6 | 40.2 |
| 20.0 | 1:2.9 | 19.1 | 45.4 | 86.8 |

The controlled release of permanganate ion from the composition of the invention differs from the bleaching action described in U.S. Patent No. 4,961,751 to Eissele et al. in that the bleaching action of the method described in that patent is a mechanical action of abrasion between hardened products combined with additional mechanical action of touching the garments with the cementitious/permanganate product to randomly bleach the garments. In contrast, the time release of permanganate ion from the composition of the invention as described herein appears to be based upon the dissolution of the product without mechanical action or abrasion on the cured product.

Fillers may be added to the Sorel cement, but are not necessarily desirable, especially with permanganate salt contents exceeding 60 weight percent. These fillers should be inert and may include limestone or diatomaceous earth. If a filler is used, the composition should contain at least about 20 weight percent Sorel cement.

An important aspect of the invention is the natural tendency for Sorel cement during hydration to suppress or stop efflorescence or the relative migration of the cement and water soluble salt such that after curing, without such suppression, the water soluble permanganate salt appears on the surface of the hydrated Sorel cement product of the invention in slightly higher concentrations than below the surface of the product. Other cements such as Portland cement permit this relative migration of cement and permanganate salt such that the permanganate salt is on the surface of the cementitious product and thereby permit a very high initial release rate of permanganate ion when the cured product is immersed in an aqueous media. See FIG. 1. In contrast Sorel cement does not permit such efflorescence during molding and hydration of the product. This phenomena results in the product of the invention with the Sorel cement outer layer which is substantially free of water soluble permanganate salt and an inner core with extremely large relative amounts of permanganate ion such that the molded cementitious product may contain up to about 90 weight percent water soluble permanganate salt. In this connection, it has been discovered that Sorel cement is highly compatible with permanganate and permits a product having up to about 90 weight percent permanganate salt. Contrastingly, it has been found that Portland cement will tolerate only up to about 80 weight percent permanganate salt. However, the mechanical stability of the Portland cement/KMnO4 pellets starts to deteriorate when the KMnO4 content is raised much over 70 weight percent.

Molding is an important aspect of the process of making the composition of the invention. In making the composition of the invention, the unhydrated Sorel cement, water soluble permanganate salt and water are mixed to form a moldable mixture. Prior to curing, the moldable mixture comprises from about 5 to about 35 weight percent unhydrated Sorel cement, from about 5 to about 35 weight percent water, and preferably from about 10 to about 20 weight percent unhydrated Sorel cement, and from about 10 to about 20 weight percent water soluble.

The paste to be molded is prepared by the following procedure.

Weighed quantities of magnesium oxide and potassium permanganate are intimately mixed to produce a dry powder. In a separate operation, magnesium chloride (or -sulfate) is dissolved in water to give a 28% (w/w) solution.

Predetermined amounts of the dry mix and the 28% solution are then combined with agitation in such a manner that clumping is largely avoided. (At low MgCl2:MgO ratios, the addition of some water might still be necessary to obtain a sufficiently fluid paste.)

After the Sorel cement, permanganate salt and water are mixed, the mixture is put into molds and cured to permit hydration as follows.

The homogeneous paste is poured in plastic molds (i.e. polyethylene, polypropylene, poly-tetrafluoro ethylene, which is commercially available under the name Teflon from duPont) of the desired size and geometrical shape. (Molds made from metal could also be used but parting agents might have to be employed to facilitate the removal of the cured pellets from the mold.) The material is then allowed to cure at ambient temperature. The curing process is slightly exothermic but the heat generated generally does not raise the temperature but a few degrees.

Curing time requirements depend largely on the fluidity of the paste and can range from about 2 hours to over 24 hours. Optionally, the pellet can be removed from the mold before fully cured, as long as it has sufficient mechanical stability to be extricated from the mold. After curing, the hydrated Sorel cement composition of the invention is removed from the molds ready for use.

In the aspect of the invention which includes coating the cured Sorel cementitious product with another layer of Sorel cement, after the cementitious/permanganate product cures and hardens it may be coated and encapsulated with a layer of Sorel cement. Coating may be done by dip coating, spray coating, fluidized bed coating or pan coating. The Sorel cement used to coat is mixed with sufficient water effective for permitting the coating process such as from about 50 to about 66 weight percent Sorel cement and from about 34 to about 50 weight percent water for dip coating. This additional layer ranges in thickness from about 0.1 to about 2 mm.

The size and shape of the molded product has significance with regard to release rate and the useful life of the products to be designed for specific applications. With some simplifications, the shape of the distribution of permanganate salt in the core of the product will conform to the shape of the overall product and it is believed that in the molded products of the invention with high permanganate contents (>80% permanganate salt), the release rate is approximately proportional to the surface area of permanganate salt which is exposed to water. This may change if the MgO exceeds 20 weight percent of the molded product.

Given a particular formulation of the molded product, the release rate (i.e. the quantity of permanganate salt dissolved per unit time) is largely controlled by surface area of permanganate salt crystals exposed to water. As this surface area changes due to the molded product becoming smaller by dissolution, the release rate of permanganate ion into the aqueous media also becomes correspondingly smaller. Surface area is, however, closely related to the size and geometry of the pellet.

A molded product of a given weight has the least surface area when it is shaped into a sphere. As the diameter increases, the surface area per unit weight of molded product decreases, with a corresponding decline in the relative rate of release. Thus, if a molded spherical product is to have substantial longevity in actual use, its diameter will be relatively large. How large will primarily depend on the desired longevity as well as the intended rate of release, which is at least partially controlled by the dissolution characteristics of the molded product. Moreover, if a single molded pellet or sphere cannot release the require quantities of permanganate per unit time, additional molded spheres or pellets will have to be used.

For the molded product of the invention a spherical shape is an important aspect of the invention
(a) the spherical shape minimizes exposed sur face area (and consequently the release rate) and this factor can be used in designing a product release over time for time delayed and for control of a permanganate;
(b) the release rate from a spherical product should be much more predictable than from any other configuration; and
(c) the production of spherical products should be attainable by spheronization (tumbling) of uncured extrudates.

The molded composition of the invention provides an ideal method of releasing permanganate ion in an aqueous media without the intervention of mechanical or electrical metering devices. According to the method, the cured molded product is mixed or immersed into the aqueous media, the hydrated cement is dissolved over time and the permanganate ion is released into the aqueous media over time. Moreover, the rate of release may be changed by changing the size and shape of the product and/or increasing the amount of $MgCl_2$ or $MgSO_4$ relative to MgO to increase the release rate.

The following examples set forth exemplary ways of making the compositions according to the invention.

EXAMPLE 1

Fifteen grams of potassium permanganate were carefully blended with 5.0 g magnesium oxide and then combined with 1.84 g $MgCl_2$ in the form of a 28% aqueous magnesium chloride solution. Part of the resulting paste was placed into a plastic mold and allowed to harden overnight.

One pellet of this material containing 56.4% $KMnO_4$ and weighing 10.34 g with the physical dimensions of 0.5" diameter and 1.5" length was placed in an extraction tube. With a total volume of 618 L distilled water recirculated through the tube at the rate of 200 ml/min, it was found that after 51.5 hours, 51.1% of the $KMnO_4$ originally present had been extracted with the $MNnO_4$ concentration ranging from 7.8 mg/L $KMnO_4$ at the 2 hr. mark to 3.4 mg/L $KMnO_4$ after 51.5 hours.

EXAMPLE 2

A pellet prepared according to the procedure described in Example 1, but containing 72.7% $KMnO_4$, embedded in a matrix consisting of Sorel cement with a molar ratio of $MgCl_2$:MgO = 1:7.2 was subjected to a static leaching test. This test was performed by suspending a pre-weighed pellet from a thin wire into a 17" column of water of ambient temperature about 3" from the top. Periodically, the $KMnO_4$ released into the water was measured spectrophotometrically and recorded as % of the total $KMnO_4$ contained in the pellet. After one hour, 12.3% of the $KMnO_4$ was found in solution, after 5 hours it was 30.1% whereas after 30 hours, 62.3% of the permanganate originally in the pellet had been released.

EXAMPLE 3

A pellet of similar $KMnO_4$-content (75%) as described in Example 2 but with a Sorel cement matrix of a molar ratio of $MgCl_2$:MgO = 1:2.9, (also prepared by the method shown in Example 1) was extracted with water under the same conditions as used in Example 2. Results obtained for extraction times of 1, 5, and 30 hours indicated that 13.8%, 35.1% and 75.7% respectively of the $KMnO_4$ originally present had been released.

EXAMPLES 4,5,6,7,8,&9

Pellets made in accordance with the method described in Examples 1 and 2 were extracted with water as described in Examples 2 and 3. The results for extraction of $KMnO_4$ are shown below as Examples 4–9.

| | % $KMnO_4$ Content | $MgCl_2$:MgO | % of Total $KMnO_4$ Released at Hrs. | | |
|---|---|---|---|---|---|
| | | | 1 hr. | 5 hrs. | 30 hrs. |
| Example 4: | 58.1 | 1:7.2 | 5.6 | 13.7 | 37.1 |
| Example 5: | 60.0 | 1:2.9 | 12.9 | 34.4 | 74.8 |
| Example 6: | 39.2 | 1:7.2 | 2.8 | 9.4 | 35.6 |
| Example 7: | 40.0 | 1:2.9 | 13.9 | 39.3 | 83.0 |
| Example 8: | 20.0 | 1:7.2 | 1.6 | 10.6 | 40.2 |
| Example 9: | 20.0 | 1:2.9 | 19.1 | 45.4 | 86.8 |

The potential uses for a method and product which controls the release permanganate ion in an aqueous media are many. For drinking water, the method and composition of the invention may be used to destroy or discourage growth of taste and odor producing or filter clogging algae in water reservoirs, and water purification plant operations in general; to discourage growth of nuisance mollusks (Zebra Mussels, corbicula) in pipelines and on equipment surfaces; to eliminate waterborne parasites such as giardia; to treat water for taste and odor and ion and manganese; and to disinfect water, using either straight permanganate or formulations of permanganate with, for example, copper ion and silver ion. For municipal waste water, the method and composition of the invention may be used to control odors ($H_2S$, mercaptans, sulfides); to prevent corrosion; and to enhance dewatering. For industrial waste water, the method and composition of the invention may be used to control odors (such as occur in meat and vegetable packing, fermentation operations and tanneries); to destroy toxics (such as —CN and phenols); to remove color (such as in dye manufacture, dying operations, chemical operations, pulp and paper); to control COD, BOD; and to destroy organic chelants in order to make heavy metal ions precipitable (in electroless plating waste). For swimming pool water, the method and composition of the invention may be used to purify swimming pool water in a filter-equipped side stream. For water run offs, the method and composition of the invention may be used to purify pesticide-containing agricultural run offs; and to treat mining run offs (coal, minerals). In fish farming, the method and composition of the invention may be used to control DO, algae and parasites. In miscellaneous water use, such as cooling towers, the method and composition of the invention may be used to readjust redox potential (ORP); to prevent systems from becoming anaerobic, or in corrosion protection of metal parts or to optimize conditions for disinfection, i.e., to discourage biological growth. For air and gas purification, the method and composition of the invention may be used to replenish $KMnO_4$ in scrubbing operations with recirculated scrubbing liquor; and to supply $KMnO_4$ in once-through scrubbing systems. For metal cleaning such as descaling and de-smutting, the method and composition of the invention may be used to replenish $KMnO_4$ as it is consumed. For orqanic oxidations, the method and composition of the invention may be used to control the rate of the oxidation reaction, including for the prevention of run-away reactions; and in solvent purifications, to replenish the $KMnO_4$ at about the rate it is consumed.

Although the invention has been described with regard to its preferred embodiments, it should be understood that various changes and modifications as would be obvious to one having the ordinary skill in this art may be made without departing from the scope of the invention which is set forth in the claims appended hereto.

The various features of this invention which are believed new are set forth in the following claims.

What is claimed is:

1. A sorel cement product comprising hydrated Sorel cement and a water soluble permanganate salt, the product having a hydrated Sorel cement outer layer substantially free of permanganate salt and a core comprising hydrated Sorel cement and permanganate salt, the product comprising from about 10 to about 70 weight percent hydrated Sorel cement and from about 30 to about 90 weight percent water soluble permanganate salt.

2. A sorel cement product as recited in claim 1 wherein the product comprises from about 20 to about 40 weight percent hydrated Sorel cement and from about 60 to about 80 weight percent water soluble permanganate salt.

3. A Sorel cement product as recited in claims 1 or 2 wherein the product comprises from about 20 to about 40 weight percent Sorel cement and from about 60 to about 80 weight percent water soluble permanganate salt.

4. A Sorel cement product as recited in claims 1, 2 or 3 wherein the product is further coated with layer or Sorel cement to provide a coating on the outer layer of the product.

5. A Sorel product as recited in claims 1, 2 or 3 wherein the hydrated Sorel cement comprises $MgCl_2$ and MgO, the $MgCl_2$ being present in a ratio of at least about one mole $MgCl_2$ for about every 30 moles of MgO.

6. A Sorel cement product as recited in claim 5 wherein the $MgCl_2$ is present in a ratio of at least about one mole $MgCl_2$ for about every 3.6 to about 8.3 moles of MgO.

7. A Sorel cement product as recited in claims 1, or 3 wherein the hydrated Sorel cement comprises $MgSO_4$ and MgO, the $MgSO_4$ being present in a ratio of at least about one mole $MgSO_4$ for about every 30 moles of MgO.

8. A Sorel cement product as recited in claim 5 wherein the $MgSO_4$ is present in a ratio of at least about one mole $MgSO_4$ for about every 3.6 to about 8.3 moles of MgO.

9. A Sorel cement product as recited in claims 1, or 3 wherein the hydrated Sorel cement comprises $MgCl_2$, $MgSO_4$ and MgO, the combined amount of $MgCl_2$ and $MgSO_4$ being present in a ratio of at least about one mole $MgCl_2$ and $MgSO_4$ combined for about every 30 moles MgO.

10. A method of controlling the release of permanganate ion in an aqueous media, the method comprising:
    mixing a hydrated Sorel cement permanganate product into an aqueous media,
    the Sorel cement permanganate product having a Sorel cement outer layer substantially free of water soluble permanganate salt and a core comprising Sorel cement and water soluble per-manganate salt, the product comprising from about 10 to about 70 weight percent Sorel cement and from about 30 to about 90 weight percent water soluble permanganate salt.

11. A method of controlling the release of permanganate ion as recited in claim 10 wherein the hypermanganate Sorel cement comprises $MgCl_2$ and MgO, the $MgCl_2$ bring present in a ratio of at least about one mole $MgCl_2$ for about every 30 moles of MgO.

12. A method of controlling the release of permanganate ion as recited in claim 10 wherein the hydrated Sorel cement comprises $MgSO_4$ and MgO, the $MgSO_4$ being present in a ratio of at least about one mole $MgSO_4$ for about every 30 moles of MgO.

13. A method of controlling the release of permanganate ion as recited in claim 11 wherein the $MgCl_2$ is present in a ratio of at least about one mole $MgCl_2$ for about every 3.6 to about 8.3 moles of MgO.

14. A method of controlling the release of permanganate ion as recited in claim 12 wherein the $MgSO_4$ is present in a ratio of at least about one more $MgSO_4$ for about every 3.6 to about 8.3 moles of MgO.

15. A method of controlling the release of permanganate ion as recited in claim 10 wherein the hydrated Sorel cement comprises $MgCl_2$, $MgSO_4$ and MgO, the combined amount of $MgCl_2$ and $MgSO_4$ being present in a ratio of at least about one mole $MgCl_2$ and $MgSO_4$ combined for about every 30 moles MgO.

16. A method of making a Sorel cement product comprising:
    a mixing Sorel cement, water soluble permanganate salt and water to form a moldable mixture, the moldable mixture comprising from about 5 to about 35 unhydrated Sorel cement, from about 30 to about 90 weight percent water soluble permanganate salt and from about 5 to about 35 weight percent water, which becomes part of the Sorel percent upon curing the cement; and
    curing the cement in molds which provides a hydrated cement product which includes the water soluble permanganate salt.

17. A method of making a Sorel cement product as recited in claim 16 wherein the Sorel cement comprises $MgCl_2$ and MgO, the $MgCl_2$ being present in a ratio of at least about one mole $MgCl_2$ for about every 30 moles MgO.

18. A method of making a Sorel cement product as recited in claim 16 wherein the Sorel cement comprises $MgSO_4$ and MgO, the $MgSO_4$ being present in a ratio of at least about one mole $MgSO_4$ for about every 30 moles $MgO$.

19. A method of making a Sorel cement product as recited in claim 17 wherein the $MgCl_2$ is present in a ratio of at least about one mole $MgCl_2$ for about every 3.6 to about 8.3 moles of $MgO$.

20. A method of making a Sorel cement product as recited in claim 18 wherein the $MgSO_4$ is present in a ratio of at least about one mole $MgSO_4$ for about every 3.6 to about 8.3 moles of $MgO$.

21. A method, of making a Sorel cement product as recited in claim 16 wherein the Sorel cement comprises $MgCl_2$, $MgSO_4$ and $MgO$, the combined amount of $MgCl_2$ and $MgSO_4$ being present in a ratio of at least about one mole $MgCl_2$ and $MgSO_4$ combined for about every 30 moles $MgO$.

* * * * *